US011099074B2

(12) United States Patent
Kikuta et al.

(10) Patent No.: US 11,099,074 B2
(45) Date of Patent: Aug. 24, 2021

(54) MOLDED PIECE SET, COMPUTER COLOR MATCHING SYSTEM, DATABASE, AND METHOD OF MANUFACTURING MOLDED PIECE SET (71) Applicants: DAINICHISEIKA COLOR & CHEMICALS MFG. CO., LTD., Tokyo (JP); DAIKIN INDUSTRIES, LTD., Osaka (JP); DAIKIN AMERICA, INC., Orangeburg, NY (US)

(72) Inventors: Ikuo Kikuta, Tokyo (JP); Fumiya Aizawa, Tokyo (JP); Shingo Sakuda, Tokyo (JP); Yuji Arashima, Tokyo (JP); Aya Sakai, Osaka (JP); Michiko Kitagawa, Osaka (JP); Natsue Miyoshi, Osaka (JP); Mitsuru Kishine, Osaka (JP); Hiroshi Nishimura, Osaka (JP)

(73) Assignees: DAINICHISEIKA COLOR & CHEMICALS MFG. CO., LTD., Tokyo (JP); DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/754,551

(22) PCT Filed: Oct. 12, 2018

(86) PCT No.: PCT/JP2018/038094
§ 371 (c)(1),
(2) Date: Apr. 8, 2020

(87) PCT Pub. No.: WO2019/074096
PCT Pub. Date: Apr. 18, 2019

(65) Prior Publication Data
US 2020/0284658 A1 Sep. 10, 2020

(30) Foreign Application Priority Data

Oct. 13, 2017 (JP) ............................. JP2017-199860

(51) Int. Cl.
*G01J 3/46* (2006.01)
*C08K 11/00* (2006.01)

(52) U.S. Cl.
CPC ............... *G01J 3/463* (2013.01); *C08K 11/00* (2013.01); *G01J 2003/467* (2013.01)

(58) Field of Classification Search
CPC ...... G01J 3/463; G01J 2003/467; C08K 11/00
See application file for complete search history.

(56) References Cited

U.S. PATENT DOCUMENTS

2001/0052904 A1   12/2001   Sano et al.
2017/0165873 A1    6/2017   Regelman et al.
2018/0303721 A1*  10/2018   Akizumi ................ A61K 6/884

FOREIGN PATENT DOCUMENTS

JP    2001-318001 A    11/2001
JP    2002-090222 A     3/2002
(Continued)

OTHER PUBLICATIONS

International Preliminary Report on Patentability with translation of Written Opinion dated Apr. 14, 2020 from the International Bureau in International Application No. PCT/JP2018/038094.

(Continued)

*Primary Examiner* — Jamil Ahmed
(74) *Attorney, Agent, or Firm* — Sughrue Mion, PLLC (57) ABSTRACT A molded piece set including two or more colored molded pieces having different compositions. One of the colored molded pieces and at least another of the colored molded pieces have a CIEDE2000 color difference of 1.0 or lower and a metamerism index of 1.0 or lower. Also disclosed is a computer color matching system, a database including color (Continued)

data sets corresponding to two or more respective colored molded pieces having different compositions and a method for producing the molded piece set.

9 Claims, 1 Drawing Sheet

(56) References Cited

FOREIGN PATENT DOCUMENTS

| JP | 2005-508125 A | 3/2005 |
|---|---|---|
| JP | 2017-505442 A | 2/2017 |
| WO | 03/039134 A1 | 5/2003 |
| WO | 2006/101193 A1 | 9/2006 |

OTHER PUBLICATIONS

Office Action issued in priority Japanese Application No. 2017-199860 dated Sep. 25, 2018.
International Search Report for PCT/JP2018/038094 dated Jan. 8, 2019 (PCT/ISA/210).

* cited by examiner

MOLDED PIECE SET, COMPUTER COLOR MATCHING SYSTEM, DATABASE, AND METHOD OF MANUFACTURING MOLDED PIECE SET

CROSS REFERENCE TO RELATED APPLICATIONS

This application is a National Stage of International Application No. PCT/JP2018/038094 filed Oct. 12, 2018, claiming priority based on Japanese Patent Application No. 2017-199860 filed Oct. 13, 2017.

TECHNICAL FIELD

The invention relates to molded piece sets, computer color matching systems, databases, and methods for producing a molded piece set.

BACKGROUND ART

Parts of articles that are demanded to have good designs, such as interior components of automobiles and wearable devices, need to be colored so as to have a better design while ensuring characteristics required from the functional viewpoint. These parts are usually formed from different materials such as a variety of resin and a variety of rubber in accordance with the characteristics required for the respective sites where the parts are used.

Known methods for matching the color of an article to be colored formed from a specific material such as a specific rubber or a specific resin to the target color (color to be achieved) include a method of visually determining the color difference and then matching the colors and a method using computer color matching (CCM) (for example, see Patent Literature 1).

CITATION LIST

Patent Literature

Patent Literature 1: JP 2002-90222 A

SUMMARY OF INVENTION

Technical Problem

For an uncoated molded article whose parts are formed from different materials, these parts look different in color due to the difference in material even when the parts are colored in similar colors. This unfortunately causes a poor design. Even when the parts look completely the same color under a certain light source, they often look different in color (exhibit a high degree of metamerism) under a different light source due to the difference in material. This is also a cause of poor design.

Conventional studies do not include examination for high level matching of the colors between such molded pieces formed from different materials.

In view of the above current state of the art, the invention aims to provide a molded piece set in which molded pieces even having different compositions can have respective colors that visually match to each other at a high level and that visually exhibit a low degree of metamerism.

Solution to Problem

The invention relates to a molded piece set including two or more colored molded pieces having different compositions, one of the colored molded pieces and at least another of the colored molded pieces having a CIEDE2000 color difference of 1.0 or lower and an metamerism index of 1.0 or lower, the CIEDE2000 color difference and the metamerism index being determined by the methods described later.

The two or more colored molded pieces preferably satisfy at least one selected from the group consisting of a case of containing different polymers and a case of containing different additives.

Preferably, the two or more colored molded pieces satisfy at least one selected from the group consisting of a case of containing different polymers and a case of containing different additives other than dyes and pigments, and the two or more colored molded pieces contain a same dye or pigment.

The polymers preferably include at least two selected from the group consisting of a fluoroelastomer, silicone rubber, ethylene-propylene-diene rubber, styrene-butadiene rubber, nitrile rubber, acrylic rubber, a polyester elastomer, a polyurethane elastomer, polypropylene, polyethylene, polyvinyl chloride, and nylon.

The molded piece set is preferably an automobile interior, a wearable device, a pair of eyeglasses, a health product, a mobile electronic device, an earphone, a sport item, a kitchen item, a pet item, a home appliance, or an audio item, more preferably an automobile interior or a wearable device.

The invention also relates to a computer color matching system for toning colors of two or more colored molded pieces having different compositions in a molded piece set to substantially a same color, the computer color matching system including: a controller; and a storage, the controller being programmed to execute: a process (1) of receiving input of a color specification value data set corresponding to a desired target color; and a process (2) of calculating ratios of colorants for adjusting a CIEDE2000 color difference to 1.0 or lower and a metamerism index to 1.0 or lower between one of the colored molded pieces and at least another of the colored molded pieces based on the input color specification value data set and color data sets that are stored in the storage and that correspond to the two or more respective colored molded pieces having different compositions, the CIEDE2000 color difference and the metamerism index being determined by the methods described later.

The invention also relates to a database including color data sets corresponding to two or more respective colored molded pieces having different compositions, the color data sets being read out by a controller and used for calculating ratios of colorants for adjusting a CIEDE2000 color difference to 1.0 or lower and a metamerism index to 1.0 or lower between one of the colored molded pieces and at least another of the colored molded pieces, the CIEDE2000 color difference and the metamerism index being determined by the methods described later.

The invention also relates to a method for producing a molded piece set that includes two or more colored molded pieces having different compositions, the method including a step (1) of adjusting a CIEDE2000 color difference to 1.0 or lower and a metamerism index to 1.0 or lower between one of the colored molded pieces and at least another of the colored molded pieces, the CIEDE2000 color difference and the metamerism index being determined by the methods described later.

The methods for determining the CIEDE2000 color difference and the metamerism index in the above respective aspects of the invention are as follows:

(CIEDE2000 Color Difference)

the CIEDE2000 color difference being determined by colorimetry on each colored molded piece in conformity with JIS Z8722:2009 with an F2 light source and a 10° visual field in conformity with JIS Z8781-4:2013 and JIS Z8781-6:2017;

(Metamerism Index)

the metamerism index being determined by colorimetry on each colored molded piece in conformity with JIS Z8722:2009 with F2 and $D_{65}$ light sources and a 10° visual field at a wavelength interval of 10 nm in conformity with JIS Z8781-4:2013 and JIS Z8719-1996.

Advantageous Effects of Invention

The molded piece set of the invention has the aforementioned structure. Thus, the molded pieces thereof even having different compositions can have respective colors that visually match to each other at a high level and that visually exhibit a low degree of metamerism. Therefore, the molded piece set of the invention has a very good design.

DESCRIPTION OF EMBODIMENTS

The invention will be described in detail below.

The molded piece set of the invention includes two or more colored molded pieces having different compositions.

The two or more colored molded pieces in the molded piece set of the invention may be in contact with each other or may be apart from each other. In the case where the two or more colored molded pieces are in contact with each other, they may only be in physical contact with each other, or may chemically adhere to each other. Further, the two or more colored molded pieces may be in direct contact with each other, or may be in contact with each other with another part in between, for example. The molded piece set of the invention may be a stack of the two or more colored molded pieces.

Each colored molded piece is preferably a molded piece of a molding material containing a coloring component such as a dye or pigment and excludes articles colored by the presence of a color coat such as a film of color paint. Still, a coat that causes substantially no influence on the color derived from the molding material, such as a colorless, transparent film, may be present on the surface of the molded piece.

In order to reduce impairment of the function and texture of the surface of the material itself, the colored molded piece is preferably an uncoated colored molded piece.

The two or more colored molded pieces have different compositions. The phrase "have different compositions" means that the two or more colored molded pieces are different in at least one selected from the types of materials and the ratio of the materials.

The molded piece set of the invention needs to include two or more colored molded pieces having different compositions, but the number of colored molded pieces having the same composition may be one or more. The number of colored molded pieces having different compositions may be any number that is two or greater. The upper limit thereof may be 10, for example.

The molded piece set of the invention satisfies that one of the colored molded pieces and at least another of the colored molded pieces have a CIEDE2000 color difference (hereinafter, also referred to as $\Delta E_{00}$) of 1.0 or lower and a metamerism index of 1.0 or lower. The colored molded pieces having the $\Delta E_{00}$ and the metamerism index within the above respective ranges enable the molded piece set of the invention in which the molded pieces even having different compositions can have respective colors that visually match to each other at a high level (by human visual sensation) and that visually exhibit a low degree of metamerism. Thus, the molded piece set of the invention has a very good design. Further, even though the molded pieces (parts or portions of the molded piece set) have different compositions so as to achieve the respective required characteristics, the colors of the molded pieces match to each other at a high level to give a sense of unity. This enables both the characteristics required for the molded pieces and a very good design of the whole molded piece set.

The $\Delta E_{00}$ and the metamerism index need to be satisfied between one of the colored molded pieces constituting the molded piece set of the invention and at least another of the colored molded pieces having a composition different from that of the former colored molded piece.

The $\Delta E_{00}$ and the metamerism index are preferably satisfied between one of the colored molded pieces constituting the molded piece set of the invention and every colored molded piece having a composition different from that of the former colored molded piece, more preferably satisfied in every pair of the colored molded pieces, i.e., in every combination of any two selected from the colored molded pieces constituting the molded piece set of the invention.

The $\Delta E_{00}$ herein is a value determined by colorimetry on colored molded pieces in conformity with JIS Z8722:2009 and determining the value with an F2 light source and a 10° visual field in conformity with JIS Z8781-4:2013 and JIS Z8781-6:2017.

The metamerism index herein is a value determined by colorimetry on colored molded pieces in conformity with JIS Z8722:2009 and determining the value with F2 and D light sources and 10° visual field at a wavelength interval of 10 nm in conformity with JIS Z8781-4:2013 and JIS Z8719-1996.

The $\Delta E_{00}$ is preferably 0.80 or lower, more preferably 0.70 or lower, still more preferably 0.60 or lower, particularly preferably 0.50 or lower. The lower limit of the $\Delta E_{00}$ may be, but is not limited to, 0.0.

The metamerism index is preferably 0.80 or lower, more preferably 0.70 or lower, still more preferably 0.60 or lower, particularly preferably 0.50 or lower. The lower limit of the metamerism index may be, but is not limited to, 0.0.

The $\Delta E_{00}$ and the metamerism index within the above respective ranges enable the molded piece set in which the colored molded pieces can have respective colors that visually match to each other at a higher level and that visually exhibit a lower degree of metamerism.

The $\Delta E_{00}$ and the metamerism index are preferably values determined by a 45/0 type colorimetric optical system. This enables matching of colors and reduction of metamerism by a sense much closer to the visual sensation of human (visual inspection).

The two or more colored molded pieces are preferably colored in similar colors. The similar colors mean colors that can be recognized as substantially the same color in color comparison with the colored molded articles put apart from each other.

The two or more colored molded pieces each preferably have a value V of 8.8 or lower or a chroma C of 1.0 or higher in the Munsell color system. Colored molded pieces each having a value V or a chroma C within the above range usually tend to exhibit a high degree of metamerism. Surprisingly, the colored molded pieces of the molded piece set of the invention even having a value V or a chroma C within the above range can have respective colors that visually match to each other at a high level and that visually exhibit a low degree of metamerism.

The colored molded pieces are preferably molded pieces of polymers.

The materials of the colored molded pieces preferably include, but are not limited to, a polymer, more preferably include a polymer and an additive. In this case, the additive at least includes a coloring component such as a dye or pigment.

The polymer may be any polymer that can be used as a molding material. Examples thereof include a fluoroelastomer, silicone rubber, ethylene-propylene-diene rubber, styrene-butadiene rubber, nitrile rubber, acrylic rubber, a polyester elastomer, a polyurethane elastomer, polypropylene, polyethylene, polyvinyl chloride, and nylon. Preferred are at least two selected from the group consisting of a fluoroelastomer, silicone rubber, ethylene-propylene-diene rubber, styrene-butadiene rubber, nitrile rubber, acrylic rubber, a polyester elastomer, a polyurethane elastomer, polypropylene, polyethylene, polyvinyl chloride, and nylon, more preferred are at least two selected from the group consisting of a fluoroelastomer, silicone rubber, a polyurethane elastomer, polypropylene, and polyvinyl chloride, still more preferred are at least two selected from the group consisting of a fluoroelastomer, silicone rubber, and a polyurethane elastomer.

Examples of the dye or pigment include an inorganic pigment, an organic pigment, and dye. Each of these may be used alone or two or more thereof may be used in the form of a mixture. Preferred are an inorganic pigment and an organic pigment.

Examples of the inorganic pigment include natural products such as clay, barite, mica, and talc, ferrocyanides such as Prussian blue, sulfides such as zinc sulfide, sulfates such as barium sulfate, oxides such as chromium oxide, zinc oxide, titanium oxide, and iron oxide, hydroxides such as aluminum hydroxide, silicates such as calcium silicate and ultramarine, carbonates such as calcium carbonate and magnesium carbonate, carbon such as carbon black and graphite, metal powders such as aluminum powder, bronze powder, and zinc powder, and other sintered pigments. Preferred among these are titanium oxide, iron oxide, and carbon black because they can commonly be used for a wide variety of polymers.

Examples of the organic pigment include azo-based pigments such as monoazo pigments and condensed azo pigments, indanthrene-based pigments such as anthraquinone-based pigments, perinone-based pigments, perylene-based pigments, and thioindigo-based pigments, phthalocyanine-based pigments such as phthalocyanine blue and phthalocyanine green, quinacridone-based pigments, dioxazine-based pigments, isoindolinone-based pigments, pyrrolopyrrole-based pigments, aniline black, and organic fluorescent pigments. Preferred among these are azo-based pigments, anthraquinone-based pigments, perinone-based pigments, perylene-based pigments, phthalocyanine-based pigments, quinacridone-based pigments, dioxazine-based pigments, isoindolinone-based pigments, and pyrrolopyrrole-based pigments because they can commonly be used for a wide variety of polymers.

Examples of the dye include anthraquinone-based dyes, heterocycle-based dyes, methine-based dyes, perinone-based dyes, and perylene-based dyes.

The dye or pigment used preferably includes at least one selected from the group consisting of 16 species (W-6 to V-37), excluding Y-138, listed in the column of C.I. Pigment of Table 1 shown below.

Examples of the additive other than the dyes and pigments include filler, an acid acceptor, a processing aid, a plasticizer, a softening agent, an antioxidant, a stabilizer, an adhesive aid, a release agent, a conductivity-imparting agent, a thermal-conductivity-imparting agent, a surface non-adhesive agent, a tackifier, a flexibility-imparting agent, a heat resistance improver, a flame retarder, an ultraviolet absorber, an oil resistance improver, a blowing agent, a scorch retarder, a lubricant, an epoxy resin, and an antifouling modifier.

The two or more colored molded pieces may be different only in types of the materials, only in ratio of the materials, or in both types and ratio of the materials. They are preferably different at least in types of the materials.

The two or more colored molded pieces preferably contain different polymers and/or contain different additives (satisfy at least one selected from the group consisting of a case of containing different polymers and a case of containing different additives).

In other words, preferably, the types of the constituent polymers are different from each other and/or the types of the constituent additives are different from each other (the types of the constituent polymers are different from each other, the types of the constituent additives are different from each other, or the types of the constituent polymers and the types of the constituent additives are both different from each other).

The two or more colored molded pieces more preferably contain different polymers and/or contain different additives other than dyes and pigments and contain the same dye or pigment (satisfy at least one selected from the group consisting of the case of containing different polymers and the case of containing different additives other than dyes and pigments and satisfy the case of containing the same dye or pigment).

In other words, more preferably, the types of the constituent polymers are different from each other and/or the types of the constituent additives other than dyes and pigments are different from each other (the types of the constituent polymers are different from each other, the types of the constituent additives other than dyes and pigments are different from each other, or the types of the constituent polymers and the types of the constituent additives other than dyes and pigments are both different from each other), and the types of the constituent dyes or pigments are the same as each other.

Each colored molded piece may be produced by molding a composition containing at least the polymer and the dye or pigment, for example. The dye or pigment may be added as it is as a coloring component, or the dye or pigment may be dispersed or dissolved in a vehicle to prepare a coloring composition before addition. The dye or pigment or the coloring composition may be dispersed in the polymer to prepare a coloring masterbatch before addition. The composition may be molded by any of methods including known methods such as compression molding, extrusion molding, transfer molding, and injection molding. In the case where the polymer is rubber, the molding may be followed by or may be performed simultaneously with crosslinking. The crosslinking may be performed by any method and may be performed by a known method.

The invention also relates to a method for producing a molded piece set that includes two or more colored molded pieces having different compositions, the method including a step (1) of adjusting a CIEDE2000 color difference ($\Delta E_{00}$) to 1.0 or lower and a metamerism index to 1.0 or lower between one of the colored molded pieces and at least another of the colored molded pieces. The production method of the invention can suitably produce the aforementioned molded piece set of the invention.

The step (1) can be performed by allowing one of the colored molded pieces and at least another of the colored molded pieces having a composition different from that of the former colored molded piece to have a $\Delta E_{00}$ of 1.0 or lower and a metamerism index of 1.0 or lower. In the step (1), one of the colored molded pieces and every colored molded piece having a composition different from that of the former colored molded piece are preferably allowed to have a $\Delta E_{00}$ of 1.0 or lower and a metamerism index of 1.0 or lower. More preferably, every pair of the colored molded pieces is allowed to have a $\Delta E_{00}$ of 1.0 or lower and a metamerism index of 1.0 or lower.

The step (1) is a step of matching the colors of two or more colored molded pieces having different compositions so as to allow the $\Delta E_{00}$ and the metamerism index to fall within the above respective predetermined ranges in consideration of the difference in types and/or ratio of the materials. This is a novel step that has never been conventionally examined.

The step (1) may preferably include the following steps (1-1) to (1-7), for example.

Step (1-1): The ratios of colorants for toning the colors of the respective colored molded pieces are determined based on the desired target color (color to be achieved).

Step (1-2): Samples of the respective colored molded pieces are produced based on the ratios of the colorants determined in the step (1-1).

Step (1-3): The samples produced in the step (1-2) are used to determine the $\Delta E_{00}$ and the metamerism index, and whether these values fall within the above respective ranges is decided.

Step (1-4): When the $\Delta E_{00}$ and the metamerism index determined in the step (1-3) do not fall within the above respective ranges, the ratios of the colorants for toning the colors of the respective colored molded pieces are modified.

Step (1-5): Samples of the respective colored molded pieces are produced based on the ratio of the colorants modified in the step (1-4).

Step (1-6): The samples produced in the step (1-5) are used to determine the $\Delta E_{00}$ and the metamerism index, and whether these values fall within the above respective ranges is decided.

Step (1-7): The steps (1-4) to (1-6) are repeated until the $\Delta E_{00}$ and the metamerism index between the samples fall within the above respective ranges.

In the step (1-1), the ratios of colorants (any of dyes and pigments, coloring compositions, and coloring masterbatches) that are expected to allow one of the colored molded pieces and at least another of the colored molded pieces to have a $\Delta E_{00}$ of 1.0 or lower and a metamerism index of 1.0 or lower are determined so as to achieve the target color in consideration of the types and ratios of the materials (e.g., any of polymers and/or additives other than dyes and pigments) used for the respective colored molded pieces. The target color may be a color determined in accordance with the use of the molded piece set, for example.

The step (1-1) is a step of determining the ratios of the colorants of the two or more colored molded pieces having different compositions so as to allow the $\Delta E_{00}$ and the metamerism index to fall within the respective predetermined ranges in consideration of the difference in types and ratio of the materials. This is a novel step that has never been conventionally examined.

The ratios of the colorants in the step (1-1) may be determined by a person skilled in the art based on a variety of findings, or may be determined using computer color matching (CCM). Preferred is CCM because it can reduce the amount of trial and error.

The step (1-1) may include a step (1-1-a) of toning the color of one of the colored molded pieces based on the desired target color (color to be achieved) and a step (1-1-b) of determining the ratio of colorants for toning the color of another colored molded piece based on the toned color of the former colored molded piece. In this embodiment, the color of one of the colored molded pieces is first toned and then the color of at least another of the colored molded pieces is matched to the former colored molded piece, whereby the colors of the molded pieces are matched to each other. In this embodiment, the step (1-1-b) and the subsequent steps may be performed on each of the other colored molded pieces one by one, or may be performed simultaneously on a plurality or all of the other colored molded pieces.

Examples of the color toning method in the step (1-1-a) include visual color toning by a person skilled in the art and color toning with CCM. Any known method may be used. Preferred is CCM because it can reduce the amount of trial and error.

In the step (1-1-b), the ratio of the colorants that is expected to allow the former colored molded piece and at least another of the colored molded pieces to have a $\Delta E_{00}$ of 1.0 or lower and a metamerism index of 1.0 or lower is determined so as to achieve the color of the former colored molded piece toned in the step (1-1-a) in consideration of the types and ratio of the materials (e.g., any of polymers and/or additives other than dyes and pigments) used for the latter colored molded piece.

The step (1-1-b) is a step of determining the ratio of the colorants of a colored molded piece having a composition different from that of a colored molded piece having a predetermined composition so as to allow the $\Delta E_{00}$ and metamerism index to fall within the respective predetermined ranges in consideration of the difference in types and ratio of the materials. This is a novel step that has never been conventionally examined.

In the step (1-4), modified ratios of the colorants that are used to make the $\Delta E_{00}$ and metamerism index much closer to the values to be achieved are determined in consideration of a gap between the measured $\Delta E_{00}$ and metamerism index and the values to be achieved.

The step (1-4) is a step of modifying the ratios of the colorants of the two or more respective colored molded pieces having different compositions so as to allow the $\Delta E_{00}$ and metamerism index to fall within the respective predetermined ranges in consideration of the difference in types and ratio of the materials. This is a novel step that has never been conventionally examined.

The ratios of the colorants in the step (1-4) may be determined by a person skilled in the art based on a variety of findings, or may be determined using CCM. Preferred is CCM because it can reduce the amount of trial and error.

The production of samples in the steps (1-2) and (1-5) may be performed by the aforementioned method for producing a colored molded piece, for example.

The methods for determining the $\Delta E_{00}$ and metamerism index in the steps (1-3) and (1-6) are as described above.

The production method of the invention may further include a step (2) of selecting a dye or pigment that can be used for the two or more colored molded pieces having different compositions. In the step (2), a dye or pigment is selected that can commonly be used for the materials of all colored molded pieces that are to have a $\Delta E_{00}$ of 1.0 or lower and a metamerism index of 1.0 or lower in consideration of the types and ratios of the materials (e.g., any of polymers and/or additives other than dyes and pigments) used for the respective colored molded pieces constituting the molded piece set. The dye or pigment is a dye or pigment (or a combination thereof) not only, of course, exhibiting a color that can achieve the desired target color, but also having thermal stability under processing conditions for each colored molded piece (e.g., under molding conditions and crosslinking conditions). Further, in the presence of a crosslinking step, the dye or pigment needs to avoid inhibiting the crosslink reaction.

In the case of performing the step (2), the step (2) is preferably performed before the step (1).

The production method of the invention may further include a step (3) of preparing a database including color data sets of the respective colored molded pieces constituting the molded piece set. In the case of performing the step (3), the step (3) is preferably performed before the step (1). The matching in the step (1) may be performed using a CCM system that utilizes the database. In the case of performing the steps (2) and (3), the steps are preferably performed in the order of the step (2), the step (3), and the step (1). The color data sets are preferably based on the dye or pigment selected in the step (2).

The invention also relates to a computer color matching (CCM) system for toning colors of two or more colored molded pieces having different compositions in a molded piece set to substantially the same color, the computer color matching system including: a controller; and a storage, the controller being programmed to execute: a process (1) of receiving input of a color specification value data set corresponding to a desired target color; and a process (2) of calculating ratios of colorants for adjusting a CIEDE2000 color difference ($\Delta E_{00}$) to 1.0 or lower and a metamerism index to 1.0 or lower between one of the colored molded pieces and at least another of the colored molded pieces based on the input color specification value data set and color data sets that are stored in the storage and that correspond to the two or more respective colored molded pieces having different compositions. The CCM system of the invention can suitably be used for performing the step (1), especially the steps (1-1) and (1-4), in the aforementioned production method.

The CCM system of the invention includes a controller and a storage. The controller is a device that executes a variety of operations. For example, a CPU of a computer corresponds to this device. The storage is a device that can store at least data and programs to be used in the operations. The CCM system may be stand-alone, or may be connected to the Internet. When connected to the Internet, the storage may be provided in a web server.

The controller is programmed to execute the process (1) of receiving input of a color specification value data set corresponding to the desired target color (color to be achieved). The color specification value data set is a data set obtained by expressing the target color in numbers in accordance with the color system (e.g., Munsell color system). The color specification value data set may be obtained from a color sample, or may be obtained by colorimetry on a sample (e.g., a sample of a colored molded piece whose color is matched to the desired color), for example. The input of the color specification value data set may be performed by directly inputting the values, or may be performed by inputting data corresponding to the color specification value data set, such as a color chart number of a color sample, for example.

The process (1) may further include receiving input of the spectral reflectance corresponding to the target color. This embodiment is useful when no spectral reflectance data corresponding to the target color is stored in advance, for example, when the color of a sample is measured and this color is designated as the target color.

The controller is further programmed to execute the process (2) of calculating the ratios of colorants that allow one of the colored molded pieces and at least another of the colored molded pieces to have a CIEDE2000 color difference ($\Delta E_{00}$) of 1.0 or lower and a metamerism index of 1.0 or lower based on the input color specification value data set and the color data sets that are stored in the storage and that correspond to the two or more colored molded pieces having different compositions.

The color data sets may be data sets obtained by, for example, producing multiple molded pieces for registration and determining the colors thereof. The molded pieces for registration correspond to the respective colored molded pieces that constitute the target molded piece set and that are different in types and ratio of the materials (e.g., any of polymers and/or additives other than dyes and pigments), and are colored with the different ratios of the colorants (any of dyes and pigments, coloring compositions, and coloring masterbatches). The color data set may include data of, for example, the spectral reflectances of the molded pieces for registration and a variety of coefficients (e.g., absorption coefficient, scattering coefficient) calculated from the spectral reflectances by a theoretical equation such as the Kubelka-Munk theoretical equation of color mixture or the Duncan theoretical equation of color mixture.

In the process (2), the ratios of the colorants are calculated that allow one of the colored molded pieces and at least another of the colored molded pieces having a composition different from that of the former colored molded piece to have a $\Delta E_{00}$ of 1.0 or lower and a metamerism index of 1.0 or lower. Preferably, calculated in the process (2) are the ratios of the colorants that allow one of the colored molded pieces and every colored molded piece having a composition different from that of the former colored molded piece to have a $\Delta E_{00}$ of 1.0 or lower and a metamerism index of 1.0 or lower. More preferably, calculated therein are the ratios of the colorants that allow every pair of the colored molded pieces to have a $\Delta E_{00}$ of 1.0 or lower and a metamerism index of 1.0 or lower.

In the process (2), the controller may simulate ratios of the colorants corresponding to the respective colored molded pieces based on the color data sets and determine the simulated blends of the respective colored molded pieces satisfying the following conditions (1) and (ii).

(i) The colored molded pieces have a predicted $\Delta E_{00}$ of 1.0 or lower and a predicted metamerism index of 1.0 or lower each of which are calculated based on the simulated blends of the colored molded pieces.

(ii) The difference between the tristimulus values calculated from the simulated blend of each colored molded piece and the tristimulus values corresponding to the target color calculated based on the color specification value data set falls within a predetermined range.

The predicted $E_{00}$ and the predicted metamerism index in the condition (i) may be calculated using the K/S values (K represents the absorption coefficient of the target piece and S represents the scattering coefficient thereof) of the colored molded pieces corresponding to the simulated blends determined from the K/S values of the colorants used in the simulated blends and the compositional ratios, for example.

The condition (ii) is a condition for matching the color of each colored molded piece to the target color. When the target color is designated as the color of a colored molded piece matched to the desired color, the condition (ii) is unnecessary.

The process (2) is a process of calculating the ratios of the colorants of two or more colored molded pieces having different compositions so as to allow the $\Delta E_{00}$ and the metamerism index to fall within the respective predetermined ranges in consideration of the difference in types and ratio of the constituent materials. This is a novel process that has never been conventionally examined.

In the process (2), the determined ratios of the colorants may be output as recommended ratios to a device such as a display.

The controller is preferably further programmed to execute a process (3) of receiving input of a measured $\Delta E_{00}$ and a measured metamerism index of samples of the respective colored molded pieces produced based on the ratios of the colorants calculated in the process (2) and a process (4) of modifying the ratios of the colorants based on the input measured values so as to allow one of the colored molded pieces and at least another of the colored molded pieces to have a $\Delta E_{00}$ of 1.0 or lower and a metamerism index of 1.0 or lower.

In the process (4), for example, simulation may be performed to make the $\Delta E_{00}$ and the metamerism index much closer to the values to be achieved based on the difference between the measured values of $\Delta E_{00}$ and metamerism index of the samples input in the process (3) and the predicted values of $\Delta E_{00}$ and metamerism index corresponding to the ratios of the colorants calculated in the process (2), whereby modified ratios of the colorants may be calculated.

The process (4) is a process of modifying the ratios of the colorants of the two or more colored molded pieces having different compositions so as to allow the $\Delta E_{00}$ and the metamerism index to fall within the respective predetermined ranges in consideration of the difference in types and ratio of the materials. This is a novel process that has never been conventionally examined.

The processes (3) and (4) may be repeated multiple times as appropriate (until the measured values of $\Delta E_{00}$ and metamerism index of the samples fall within the respective target ranges).

The invention also relates to a database including color data sets corresponding to two or more respective colored molded pieces having different compositions, the color data sets being read out by a controller and used for calculating ratios of colorants for adjusting a CIEDE2000 color difference to 1.0 or lower and a metamerism index to 1.0 or lower between one of the colored molded pieces and at least another of the colored molded pieces. The database of the invention can suitably be used in the step (3) of the aforementioned production method and in the processes (2) and (4) in the aforementioned CCM system, for example.

The color data sets included in the database of the invention may be data sets obtained by, for example, producing multiple molded pieces for registration and determining the colors thereof. The molded pieces for registration correspond to the respective colored molded pieces that constitute the target molded piece set and that are different in types and ratio of the materials (e.g., any of polymers and/or additives other than dyes and pigments), and are colored with the different ratios of the colorants (any of dyes and pigments, coloring compositions, and coloring masterbatches). The color data set may include data of, for example, the spectral reflectances of the molded pieces for registration and a variety of coefficients (e.g., absorption coefficient, scattering coefficient) calculated from the spectral reflectances by a theoretical equation such as the Kubelka-Munk theoretical equation of color mixture or the Duncan theoretical equation of color mixture.

The controller may be one described for the aforementioned CCM system of the invention, for example. Examples of the processes of calculating the ratios of the colorants by reading out the color data sets by the controller so as to allow one of the colored molded pieces and at least another of the colored molded pieces to have a CIEDE2000 color difference of 1.0 or lower and a metamerism index of 1.0 or lower include processes similar to the processes (2) and (4) described for the aforementioned CCM system of the invention.

The database of the invention includes color data sets for matching the colors of molded pieces different in types and ratio of the materials (e.g., any of polymers and/or additives other than dyes and pigments), and the color data sets are used to calculate the ratios of the colorants of two or more colored molded pieces having different compositions so as to allow the $\Delta E_{00}$ and the metamerism index to fall within the respective predetermined ranges in consideration of the difference in types and ratio of the materials. Such a database has never been conventionally established, and therefore the database of the invention is a novel database.

An exemplary procedure of producing the molded piece set of the invention is described with reference to the flow chart of FIG. 1.

Figure 1:
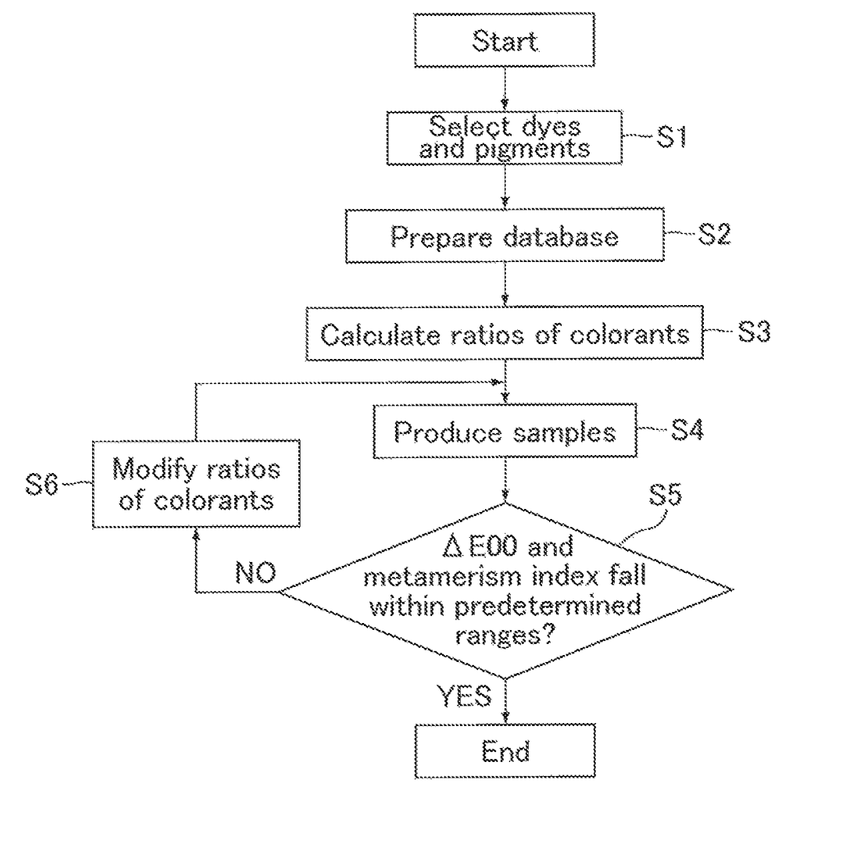
FIG. 1 is a flow chart of an exemplary procedure of producing the molded piece set of the invention.

In Step S1 of FIG. 1, dyes and pigments are selected that can be used for all colored molded pieces that are to have a $\Delta E_{00}$ of 1.0 or lower and a metamerism index of 1.0 or lower among the colored molded pieces constituting the target molded piece set. Step S1 may correspond to the aforementioned step (2), for example.

Then, in Step S2, a database is prepared including the color data sets corresponding to the respective colored molded pieces based on the dye or pigment selected in Step S1 (the database may be registered to the CCM system as appropriate). Step S2 may correspond to the aforementioned step (3), for example. The database may correspond to the aforementioned database of the invention, for example.

Then, in Step S3, the ratios of the colorants of the respective colored molded pieces are calculated that are expected to allow one of the colored molded pieces and at least another of the colored molded pieces to have a $\Delta E_{00}$ of 1.0 or lower and a metamerism index of 1.0 or lower based on the desired target color and the color data sets. Step S3 may correspond to the aforementioned step (1-1) and process (2), for example.

Then, in Step S4, samples of the respective colored molded pieces are produced based on the ratios of the colorants calculated in Step S3. Step S4 in this case may correspond to the aforementioned step (1-2), for example.

Then, in Step S5, the samples produced in Step S4 are used to determine the $\Delta E_{00}$ and the metamerism index, thereby determining whether the $\Delta E_{00}$ is 1.0 or lower and whether the metamerism index is 1.0 or lower. Step S5 in this case may correspond to the aforementioned step (1-3), for example.

When the measured values of $\Delta E_{00}$ and metamerism index are determined as fall within the above respective ranges in Step S5 (YES), the procedure is finished.

When at least one selected from the measured values of $\Delta E_{00}$ and metamerism index is determined as being outside the above range in Step S5 (NO), Step S6 is performed. In Step S6, the ratios of the colorants are modified so as to make the $\Delta E_{00}$ and the metamerism index much closer to the values to be achieved in consideration of the gap between the measured values of $\Delta E_{00}$ and metamerism index and the values to be achieved thereof. Step S6 may correspond to the aforementioned step (1-4) and process (4), for example.

Then, in Step S4, samples of the respective colored molded pieces are again produced based on the ratios of the colorants modified in Step S6. Step S4 in this case may correspond to the aforementioned step (1-5), for example.

Then, in Step S5, the samples produced in Step S6 are used to determine the $\Delta E_{00}$ and the metamerism index, thereby determining whether the $\Delta E_{00}$ is 1.0 or lower and whether the metamerism index is 1.0 or lower. Step S5 in this case may correspond to the aforementioned step (1-6), for example.

Steps S6, S4, and S5 are repeated until the $\Delta E_{00}$ and the metamerism index fall within the respective target ranges.

The molded piece set of the invention can be used in the fields of automobiles (including motorcycles), sports, home appliances, stationery, miscellaneous goods, furniture, clothing, gardening, and building materials.

As described above, the molded pieces of the molded piece set of the invention even having different compositions can have respective colors that visually match to each other at a high level and that visually exhibit a low degree of metamerism. Thus, the molded piece set of the invention has a very good design. Further, the molded piece set of the invention can achieve both the characteristics required for the respective molded pieces (parts or portions of the molded piece set) and a very good design of the whole molded piece set. Therefore, the molded piece set of the invention can suitably be used as a variety of articles each of which includes two or more parts (molded pieces) having different compositions and each of which is required to have a good design.

For example, the molded piece set of the invention can particularly suitably be used for protection covers for automobile seats, protection covers for bicycle saddles, automobile interior parts, protection sheets for furniture, kitchen items, watch belts, belts for holding articles other than watches on the body, housings of portable electronic devices and protection covers for portable electronic devices.

The molded piece set of the invention can also be used for the following applications.

Automobile Interiors
  instrument panels, decorative panels, dashboard panels, cup holders, steering wheels, armrests, door covers, shifters, door handles, and the like
Wearable Devices
  smartwatches, smartbands, smartglasses, virtual reality (VR) systems, devices attached to the body, other wearable devices (devices attached to clothes, ring-shaped devices), covers and cases for protecting or housing these devices, and the like
Eyeglasses
  nosepads, bows, and the like
Health Products
  magnetic necklaces, magnetic bracelets, magnetic adhesive bandages such as Pip Elekiban®, and the like
(Mobile) Electronic Devices
  smartphones, tablet PCs, keyboards, covers and cases for protecting or housing these devices, and the like
Earphones
  cables, earhooks, ear pieces, and the like
Sport Items
  mats, shoes, underwater masks, regulators, snorkels, diving equipment, fishing equipment, and the like
Kitchen Items
  spatulas, turners, bowls, steamers, baking pans for confectionery, cups for box lunches, rubber aprons for infants and nursing care, baby's bottles, pacifiers (containers, nipples), and the like
Pet Items
  toilet trays, food dishes, collars, and the like
Home Appliances
  kitchen units (wet areas), beauty care products, cleaners, rice cookers, electric kettles, cosmetic equipment (e.g., facial massagers, hair-care products), and the like
Audio Items
  speakers, audio systems, electronic instruments, and the like
Other Applications
  buttons, wheelchair socks, bags, eyelash curlers, hearing aids, pen grips, rubber accessories, fashion rubber accessories without magnetism, robot exteriors, robot (bending) cables, locker keys in public baths, golf club grips, camera decorative parts, toys, and the like The molded piece set of the invention is preferably an article of automobile interiors, wearable devices, eyeglasses, health products, mobile electronic devices, earphones, sport items, kitchen items, pet items, home appliances, or audio items, more preferably an article of automobile interiors, wearable devices, mobile electronic devices, earphones, or audio items, still more preferably an article of automobile interiors or wearable devices.

The molded piece set of the invention may be used as an individual article among the examples listed above, or each of the colored molded pieces constituting the molded piece set may be used as an individual article and the molded piece set of the invention may be used as a combination thereof.

An example of the former case is an article (molded piece set) including a layer (colored molded piece) for providing flexibility and a layer (colored molded piece) for providing hardness and strength stacked or linked.

Examples of the latter case include an automobile interior set (molded piece set) including a steering wheel (colored molded piece), an instrument panel (colored molded piece), and a door cover (colored molded piece) and a set (molded piece set) including a mobile electronic device (colored molded piece) such as a smartphone and a protection cover or housing case (colored molded piece) therefor.

EXAMPLES

The invention is described in detail below with reference to examples, but the invention is not intended to be limited by these examples.

(Color-Matching Materials)

The fluoroelastomer (FKM) used was a commercially available, peroxide-vulcanizable product having a fluorine content of 70.5 wt % and containing iodine. This product was combined with a vulcanizing agent, a vulcanization aid, and commercially available barium sulfate and silicon dioxide respectively in amounts of 25 phr and 5 phr as fillers.

This combination was used as a color-matching material and mixed with colorants before use.

The silicone rubber (VMQ) used was a commercially available, peroxide-vulcanizable, general extrusion grade product having a density of 1.14. This product was used as it is as a color-matching material and mixed with colorants before use.

The polyurethane elastomer (TPU) used was a commercially available, carbonate-based, calendering grade product having a hardness of 83. This product was used as a color-matching material and mixed with colorants before use.

The polyvinyl chloride (PVC) used was a product having an average degree of polymerization of 1.030 and containing 8.7 wt % of a phthalic plasticizer. This product was used as it is as a color-matching material and mixed with colorants before use.

The polypropylene (PP) used was a random-type product having a MFR of 20. This product was used as it is as a color-matching material and mixed with colorants before use.

(Selection of Pigments)

Sixteen pigments that can be used without problems in molding of resins performed at high temperatures and molding of rubbers involving a vulcanization reaction were selected as listed in the column of C.I. Pigment (W-6 to V-37) in Table 1.

(Preparation of Colorants)

The colorants used were color masterbatches each prepared in advance by dispersing the pigment at a predetermined proportion in the same material as the material to be color-matched. The proportions of the material and the pigments are as shown in Table 1.

For all materials, the color masterbatches were prepared by roll mixing at room temperature, or in a warmed state as appropriate.

(Molding Methods)

For the fluoroelastomer, the materials were sufficiently mixed using a rubber roll, the resulting compound was compression-molded using a molding press with a sheet-shaped mold, and then subjected to secondary vulcanization in an electric furnace. The resulting molded sheet was cooled down, and then used for measurements.

The silicone rubber was molded in the same manner.

The TPU, which is a thermoplastic elastomer, was molded as follows. Specifically, pellets of the material and of pigments were wrapped around a roll heated up to 150° C. and melted into a uniform product. The workpiece was sheeted and the resulting sheet was put into a sheet mold heated up to high temperature. The sheet was then molded under pressure. After a predetermined period of time, the workpiece including the mold was cooled down and the molded sheet was separated for use.

The PVC and the PP, which are thermoplastic resins, were molded as follows. Specifically, a roll was heated up to 170° C. for the PVC or up to 160° C. for the PP. Pellets of the material and of pigments were wrapped around the roll and melted into a uniform product. The workpiece was sheeted and the resulting sheet was put into a sheet mold heated up to high temperature. The sheet was then molded under pressure. After a predetermined period of time, the workpiece including the mold was cooled down and the molded sheet was separated for use.

(Color Evaluation Methods)

The spectrophotometer used was ii Pro (45/0 type) available from X-Rite Inc.

The CIEDE2000 color difference ($\Delta E_{00}$) was determined by colorimetry on samples in conformity with JIS Z8722:2009 with an F2 or $D_{65}$ light source and a 10° visual field in conformity with JIS Z8781-4:2013 and JIS Z8781-6:2017.

The metamerism index was determined by colorimetry on samples in conformity with JIS Z8722:2009 with F2 and Des light sources and a 10° visual field at a wavelength interval of 10 nm in conformity with JIS Z8781-4:2013 and JIS Z8719-1996.

In visual evaluation of color matching, the cases where the colors of the samples matched at a high level under a fluorescent lamp were evaluated as "Good", while the cases where the colors looked different were evaluated as "Poor".

In visual evaluation of metamerism, the cases where the colors of the samples matched at a high level under both a fluorescent lamp and sunlight were evaluated as "Good", while the cases where the colors of the samples looked different under both a fluorescent lamp and sunlight were evaluated as "Poor".

Example 1

The color to be achieved in the color matching was set to blue, and the target color was determined as DIC-579. The materials used were the following five materials, i.e., the fluoroelastomer, silicone rubber, TPU, PVC, and PP.

First, color matching was performed on the fluoroelastomer. A compound having a composition that is expected to visually develop the target color was actually produced. This compound was compression-molded, and then subjected to secondary vulcanization in an electric furnace. Thereby, a fluoroelastomer molded sheet was obtained. A glossy surface of this sheet was subjected to measurement using the spectrophotometer. When a difference was visually observed between the target color (DIC-579) and the color of the molded sheet, the composition was slightly modified and a molded sheet was obtained in the same manner. This process was repeated until the colors visually matched to each other, and then the color matching was finished.

As a result, the composition in the column of fluoroelastomer (FKM) of Example 1 in Table 2 provided a color that is visually very close to the target color.

Then, with respect to the glossy surface of the fluoroelastomer sheet produced above, color matching was performed on the silicone rubber.

In the color matching of the silicone rubber, a masterbatch was prepared using the same pigments as those used in the color matching of the fluoroelastomer. In consideration of the results from the fluoroelastomer, the composition was visually determined as in the case of the fluoroelastomer and slightly modified as appropriate. Thereby, the color matching was performed such that the glossy surfaces of the fluoroelastomer sheet and the silicone rubber sheet had a $\Delta E_{00}$ of 1.0 or lower and a metamerism index of 1.0 or lower. In this case, the compression molding was performed in the same manner as in the case of the fluoroelastomer, but the secondary vulcanization was not performed. The composition was shown in Table 2.

Visual observation of the glossy surfaces of the fluoroelastomer sheet and the silicone rubber sheet demonstrated that the colors thereof matched at a high level under a fluorescent lamp and were not greatly different from each other (exhibit no metamerism) under not only a fluorescent lamp but also sunlight.

For the TPU, PVC, and PP, molded sheets were produced in the same manner. Still, because the TPU is a thermoplastic elastomer and the PVC and PP are thermoplastic resins, each molded sheet was obtained by charging a color-matched compound into a mold heated up to high temperature and, after a certain period of time, cooling down the mold. Based on the compositions shown in Table 2, the colors of the glossy surfaces of the fluoroelastomer sheet and each molded sheet were matched to have a $\Delta E_{00}$ of 1.0 or lower and a metamerism index of 1.0 or lower.

Visual observation of the glossy surfaces of the fluoroelastomer sheet and each molded sheet demonstrated that the colors thereof matched at a high level under a fluorescent lamp and were not greatly different from each other (exhibit no metamerism) under not only a fluorescent lamp but also sunlight.

The results are shown in Table 3.

Example 2

Color matching was performed on the following four materials, i.e., the fluoroelastomer, TPU, silicone rubber, and PVC in the same manner as in Example 1, except that the color to be achieved in the color matching was set to green and that the target color was determined as DIC-171. The compositions and the evaluation results are shown in Tables 2 and 3.

Example 3

Color matching was performed on the following two materials, i.e., the fluoroelastomer and TPU in the same manner as in Example 1, except that the color to be achieved in the color matching was set to red and that the target color was determined as DIC-197. The compositions and the evaluation results are shown in Tables 2 and 3.

Comparative Example 1

Color matching was performed in the same manner as in the case of PVC in Example 1, except that Y-138 (Yellow) was used instead of R-122 (Red) so as to match the color of PVC to the color of the fluoroelastomer sheet obtained in Example 1 after the color matching to the target color. The color matching was performed using the composition shown in Table 2. The glossy surfaces of the fluoroelastomer sheet and the PVC sheet had a $\Delta E_{00}$ of 1.0 or lower and a metamerism index of 4.23.

Visual observation of the glossy surfaces of the fluoroelastomer sheet and the PVC sheet demonstrated that the colors thereof matched at a high level under a fluorescent lamp, but were greatly different from each other (exhibit a high degree of metamerism) under sunlight. The results are shown in Table 3.

Example 4

A computer color matching (CCM) system was used to match the colors of different materials to the same color without metamerism. First, the TPU and fluoroelastomer were selected as materials whose colors were to be matched to the same color.
(1) Selection of Pigments Pigments were selected that can be commonly used for the two materials first selected. The pigments not only need to have thermal stability under the respective processing conditions, but also need not to inhibit a crosslinking reaction when this reaction is used for curing, for example. In order to achieve color matching to a wide variety of target colors, pigments of a variety of tones are required. In consideration of these points, 16 pigments (W-6 to V-37) listed in Table 1 were selected.
(2) Establishment of CCM System The pigments selected in the above step (1) were used to prepare color masterbatches of the respective colors for each material. These color masterbatches were used to produce molded pieces for registration of the respective materials. Each molded piece was subjected to measurement by the 45/0 method to provide a color data set. The color data sets were registered in the CCM system (Colorcom System available from Dainichiseika Color & Chemicals Mfg. Co., Ltd.), whereby a database was established.
(3) Color Matching Using CCM System Based on the target color and recommended compositions therefor proposed by the CCM system, samples of the above three materials were actually produced and evaluated.

Color matching of the fluoroelastomer to the TPU molded piece after the color matching to the blue target color (DIC-579) in Example 1 was evaluated.

Table 4 demonstrates that the samples had a $\Delta E_{00}$ of 1.0 or lower and a metamerism index of 1.0 or lower in the first cycle. Table 4 further demonstrates that the $\Delta E_{00}$ and the metamerism index were improved to 0.24 and 0.25, respectively, after the second cycle.

Visual observation of the glossy surfaces of the fluoroelastomer sheet and the TPU sheet produced in each of the first and second cycles demonstrated that the colors thereof matched at a high level under a fluorescent lamp and appeared to be the same color and exhibited no metamerism even under sunlight in each cycle.

TABLE 1

| | | FKM | | VMQ | | TPU | | PVC | | PP | |
|---|---|---|---|---|---|---|---|---|---|---|---|
| | C.I. Pigment | Examples Product No. | Pigment wt % | Examples Product No. | Pigment wt % | Examples Product No. | Pigment wt % | Examples Product No. | Pigment wt % | Examples Product No. | Pigment wt % |
| White | W-6 | FKMMB 501 WHITE | 25.2 | SCT 3036 WHITE | 50.0 | TPUMB 050 WHITE | 70.0 | PVCMB 050 WHITE | 70.0 | POMB 060 WHITE | 40.0 |
| Black | BK-7 | FKMMB 518 BLACK | 6.8 | SCT 3748 BLACK | 16.0 | TRUMB 717 BLACK | 26.0 | PVCMB 717 BLACK | 26.0 | POMB 717 BLACK | 10.0 |
| Red | R-122 | FKMMB 503 RED | 12.6 | SCT 3121 RED | 19.0 | TPUMB 191 RED | 47.0 | PVCMB 191 RED | 47.0 | PCMB 121 RED | 16.7 |
| | R-272 | FKMMB 515 RED | 12.6 | SCT 3174 RED | 20.0 | TPUMB 174 RED | 50.0 | PVCMB 174 RED | 50.0 | PCMB 174 RED | 20.0 |
| | R-177 | FKMMB 516 RED | 12.6 | SCT 3165 RED | 20.0 | TPUMB 155 RED | 50.0 | PVCMB 165 RED | 50.0 | POMB 165 RED | 20.0 |
| | Y-110 | FKMMB 505 YELLOW | 12.6 | SCT 3443 YELLOW | 26.0 | TPUMB 443 YELLOW | 50.0 | PVCMB 443 YELLOW | 50.0 | POMB 443 YELLOW | 50.0 |

TABLE 1-continued

| | C.I. Pigment | FKM Examples Product No. | Pigment wt % | VMQ Examples Product No. | Pigment wt % | TPU Examples Product No. | Pigment wt % | PVC Examples Product No. | Pigment wt % | PP Examples Product No. | Pigment wt % |
|---|---|---|---|---|---|---|---|---|---|---|---|
| Yellow | Y-120 | FKMMB 512 YELLOW | 12.6 | SCT 3434 YELLOW | 20.0 | TPUMB 434 YELLOW | 50.0 | PVCMB 434 YELLOW | 50.0 | POMB 434 YELLOW | 50.0 |
| | Y-181 | FKMMB 519 YELLOW | 12.6 | SCT 3436 YELLOW | 20.0 | TPUMB 436 YELLOW | 50.0 | PVCMB 436 YELLOW | 50.0 | POMB 438 YELLOW | 50.0 |
| Blue | Bl-153 | FKMMB 507 BLUE | 12.6 | SCT 3620 BLUE | 22.0 | TPUMB 620 BLUE | 50.0 | PVCMB 620 BLUE | 50.0 | POMB 616 BLUE | 20.0 |
| | Bl-151 | FKMMB 522 BLUE | 12.6 | SCT 3640 BLUE | 25.0 | TPUMB 640 BLUE | 50.0 | PVCMB 640 BLUE | 50.0 | POMB 640 BLUE | 20.0 |
| Green | G-7 | FKMMB 506 GREEN | 12.6 | SCT 3610(A) GREEN | 25.0 | TPUMB 510 GREEN | 50.0 | PVCMB 510 GREEN | 50.0 | POMB 560 GREEN | 20.0 |
| Brown | R-101 | FKMMB 514 BROWN | 25.2 | SCT 3520 BROWN | 50.0 | TPUMB 830 BROWN | 70.0 | PVCMB 830 BROWN | 70.0 | POMB 830 BROWN | 40.0 |
| Orange | O-43 | FKMMB 517 ORANGE | 12.6 | SCT 3310 ORANGE | 20.0 | TPUMB 310 ORANGE | 50.0 | PVCMB 310 ORANGE | 50.0 | POMB 310 ORANGE | 20.0 |
| | O-64 | FKMMB 523 ORANGE | 12.6 | SCT 3311 ORANGE | 20.0 | TPUMB 311 ORANGE | 50.0 | PVCMB 311 ORNAGE | 50.0 | POMB 311 ORANGE | 20.0 |
| Violet | V-19 | FKMMB 520 VIOLET | 12.6 | SCT 3910 VIOLET | 15.0 | TPUMB 910 VIOLET | 50.0 | PVCMB 910 VIOLET | 50.0 | POMB 910 VIOLET | 20.0 |
| | V-37 | FKMMB 521 VIOLET | 12.6 | SCT 3930 VIOLET | 15.0 | TPUMB 930 VIOLET | 20.0 | PVCMB 930 VIOLET | 20.0 | POMB 530 VIOLET | 10.0 |
| Yellow | Y-158 | | | | | | | PVCMB 422 YELLOW | 48.0 | | |

TABLE 2

| | | Example 1 | | | | | Example 2 | |
|---|---|---|---|---|---|---|---|---|
| | | a | b | c | d | e | f | g |
| | | | | | Material | | | |
| | | FKM | VMQ | TPU | PVC | PP | FKM | VMQ |
| | | | | Color to be achieved | | | | |
| Composition | Unit | Blue (DIC-579) | 1-a FKM | 1-a FKM | 1-a FKM | 1-a FKM | Green (DIC-171) | 2-f FKM |
| FKM color matching material | phr | 100 | | | | | 1000 | |
| VMQ color matching material | phr | | 100 | | | | | 100 |
| TPU color matching material | phr | | | 100 | | | | |
| PVC color matching material | phr | | | | 100 | | | |
| PP color matching material | phr | | | | | 100 | | |
| FKMMB 501 WHITE | phr | 7.528 | | | | | | |
| FKMMB 518 BLACK | phr | 0.456 | | | | | 0.0685 | |
| FKMMB 503 RED | phr | 1.415 | | | | | | |
| FKMMB 507 BLUE | phr | 3.531 | | | | | | |
| FKMMB 506 GREEN | phr | | | | | | 0.828 | |
| FKMMB 512 YELLOW | phr | | | | | | 12.034 | |
| FKMMB 515 RED | phr | | | | | | | |
| FKMMB 516 RED | phr | | | | | | | |
| SCT 3036 WHITE | phr | | 0.7260 | | | | | 1.266 |
| SCT 3748 BLACK | phr | | 0.0112 | | | | | 0.0048 |
| SCT 3121 RED | phr | | 0.1180 | | | | | |
| SCT 3620 BLUE | phr | | 0.2420 | | | | | |
| SCT 3510(A) GREEN | phr | | | | | | | 0.242 |
| SCT 3434 YELLOW | phr | | | | | | | 2.960 |
| TPUMB 050 WHITE | phr | | | 0.830 | | | | |
| TPUMB 717 BLACK | phr | | | 0.020 | | | | |
| TPUMB 191 RED | phr | | | 0.046 | | | | |
| TPUMB 620 BLUE | phr | | | 0.104 | | | | |
| TPUMB 510 GREEN | phr | | | | | | | |
| TPUMB 434 YELLOW | phr | | | | | | | |
| TPUMB 185 RED | phr | | | | | | | |
| TPUMB 174 RED | phr | | | | | | | |
| PVCMB 050 WHITE | phr | | | | 0.8500 | | | |
| PVCMB 717 BLACK | phr | | | | 0.0164 | | | |
| PVCMB 191 RED | phr | | | | 0.0440 | | | |
| PVCMB 620 BLUE | phr | | | | 0.0900 | | | |
| PVCMB 432 YELLOW | phr | | | | | | | |
| PVCMB 434 YELLOW | phr | | | | | | | |
| PVCMB 510 GREEN | phr | | | | | | | |
| POMB 060 WHITE | phr | | | | | 1.300 | | |
| POMB 717 BLACK | phr | | | | | 0.046 | | |

TABLE 2-continued

| | | Example 2 | | Example 3 | | Comparative Example 1 |
|---|---|---|---|---|---|---|
| | | h | i | j | k | l |
| | | Material | | | | |
| | | TPU | PVC | FKM | TPU | PVC |
| | | Color to be achieved | | | | |
| Composition | Unit | 2-f FKM | 2-f FKM | Red (DIC-197) | 3-j FKM | 1-a FKM |
| POMB 121 RED | phr | | | | | 0.110 |
| POMB 818 BLUE | phr | | | | | 0.260 |
| FKM color matching material | phr | | | 1000 | | |
| VMO color matching material | phr | | | | | |
| TPU color matching material | phr | 100 | | | 100 | |
| PVC color matching material | phr | | 100 | | | 100 |
| PP color matching material | phr | | | | | |
| FKMMB 501 WHITE | phr | | | | | |
| FKMMB 518 BLACK | phr | | | | | |
| FKMMB 503 RED | phr | | | | | |
| FKMMB 507 BLUE | phr | | | | | |
| FKMMB 506 GREEN | phr | | | | | |
| FKMMB 512 YELLOW | phr | | | | | |
| FKMMB 515 RED | phr | | | 10.43 | | |
| FKMMB 516 RED | phr | | | 2.500 | | |
| SCT 3036 WHITE | phr | | | | | |
| SCT 3748 BLACK | phr | | | | | |
| SCT 3121 RED | phr | | | | | |
| SCT 3620 BLUE | phr | | | | | |
| SCT 3510(A) GREEN | phr | | | | | |
| SCT 3434 YELLOW | phr | | | | | |
| TPUMB 050 WHITE | phr | 0.9700 | | | 2.200 | |
| TPUMB 717 BLACK | phr | 0.0046 | | | | |
| TPUMB 191 RED | phr | | | | | |
| TPUMB 620 BLUE | phr | | | | | |
| TPUMB 510 GREEN | phr | 0.0680 | | | | |
| TPUMB 434 YELLOW | phr | 1.2200 | | | | |
| TPUMB 185 RED | phr | | | | 1.960 | |
| TPUMB 174 RED | phr | | | | 0.900 | |
| PVCMB 050 WHITE | phr | | 1.1500 | | | 1.3000 |
| PVCMB 717 BLACK | phr | | 0.0045 | | | 0.0014 |
| PVCMB 191 RED | phr | | | | | |
| PVCMB 620 BLUE | phr | | | | | 0.0260 |
| PVCMB 432 YELLOW | phr | | | | | 1.1500 |
| PVCMB 434 YELLOW | phr | | 1.0500 | | | |
| PVCMB 510 GREEN | phr | | 0.0610 | | | |
| POMB 060 WHITE | phr | | | | | |
| POMB 717 BLACK | phr | | | | | |
| POMB 121 RED | phr | | | | | |
| POMB 181 BLUE | phr | | | | | |

TABLE 3

| | Targer color | Material | Light source | $\Delta E_{00}$ | Metamerism index | L* | a* | b* | Color matching (fluorescent lamp) | Metamerism (fluorescent lamp and sunlight) |
|---|---|---|---|---|---|---|---|---|---|---|
| Example | Blue | FKM | F2 | — | — | 41.29 | −6.63 | −39.53 | — | — |
| | | VMQ | | 0.27 | 0.15 | 41.23 | −6.30 | −39.26 | Good | Good |
| | | TPU | | 0.35 | 0.26 | 41.32 | −6.23 | −39.07 | Good | Good |
| | | PVC | | 0.18 | 0.07 | 41.48 | −6.72 | −39.54 | Good | Good |
| | | PP | | 0.39 | 0.23 | 41.60 | −6.39 | −39.00 | Good | Good |
| Example 2 | Green | FKM | F2 | — | — | 67.34 | −28.96 | 58.93 | — | — |
| | | | D65 | — | — | 67.01 | −37.90 | 55.23 | | |
| | | VMQ | F2 | 0.29 | 0.58 | 67.31 | −28.97 | 58.04 | Good | Good |
| | | | D65 | 0.16 | 0.58 | 67.09 | −38.01 | 54.85 | | |
| | | TPU | F2 | 0.25 | 0.46 | 67.04 | −28.74 | 58.73 | Good | Good |
| | | | D65 | 0.40 | 0.46 | 66.62 | −37.27 | 55.18 | | |
| | | PVC | F2 | 0.21 | 0.19 | 67.21 | −28.59 | 57.75 | Good | Good |
| | | | D65 | 0.18 | 0.19 | 66.85 | −37.30 | 54.21 | | |

TABLE 3-continued

| | Target color | Material | Light source | $\Delta E_{00}$ | Metamerism index | L* | a* | b* | Color matching (fluorescent lamp) | Metamerism (fluorescent lamp and sunlight) |
|---|---|---|---|---|---|---|---|---|---|---|
| Comparative Example 1 | | FKM | F2 | — | — | 67.34 | −28.96 | 58.93 | — | — |
| | | | D65 | — | — | 67.01 | −37.90 | 55.23 | | |
| | | PVC | F2 | 0.38 | 4.23 | 67.62 | −29.68 | 59.83 | Good | Poor |
| | | | D65 | 1.88 | 4.23 | 68.73 | −41.62 | 58.75 | | |
| Example 3 | Red | FKM | F2 | — | — | 36.56 | 45.37 | 24.20 | — | — |
| | | TPU | | 0.75 | 0.61 | 37.35 | 44.64 | 24.38 | Good | Good |

TABLE 4

| | Color matching using CCM | Material | Color masterbatch | Amount* | Light source | $\Delta E_{00}$ | Metamerism index | L* | a* | b* | Color matching (fluorescent lamp) | Metamerism (fluorescent lamp and sunlight) |
|---|---|---|---|---|---|---|---|---|---|---|---|---|
| Example 4 | Color to be achieved | TPU | — | — | F2 | — | — | 41.28 | −6.97 | −38.27 | — | — |
| | First recommended composition | FKM | FKMMB 501 WHITE | 7.740 | | 0.74 | 0.46 | 41.54 | −7.30 | −35.96 | Good | Good |
| | | | FKMMB 518 BLACK | 0.530 | | | | | | | | |
| | | | FKMMB 503 RED | 1.380 | | | | | | | | |
| | | | FKMMB 507 BLUE | 3.280 | | | | | | | | |
| | Second recommended composition | FKM | FKMMB 501 WHITE | 7.600 | | 0.24 | 0.25 | 41.40 | −7.06 | −38.52 | Good | Good |
| | | | FKMMB 518 BLACK | 0.450 | | | | | | | | |
| | | | FKMMB 503 RED | 1.440 | | | | | | | | |
| | | | FKMMB 507 BLUE | 3.500 | | | | | | | | |

*Parts by weight relative to 100 parts by weight of color-matching material

The invention claimed is:

1. A molded piece set comprising two or more colored molded pieces having different compositions,
    each colored molded piece being a molded piece of a polymer and having a value V of 8.8 or lower or a chroma C of 1.0 or higher in the Munsell color system,
    one of the colored molded pieces and at least another of the colored molded pieces having a CIEDE2000 color difference of 1.0 or lower and an metamerism index of 1.0 or lower, the CIEDE2000 color difference and the metamerism index being determined by the following methods:
(CIEDE2000 color difference)
    the CIEDE2000 color difference being determined by colorimetry on each colored molded piece in conformity with JIS Z8722:2009 with an F2 light source and a 10° visual field in conformity with JIS Z8781-4:2013 and JIS Z8781-6:2017;
(metamerism index)
    the metamerism index being determined by colorimetry on each colored molded piece in conformity with JIS Z8722:2009 with F2 and $D_{65}$ light sources and a 10° visual field at a wavelength interval of 10 nm in conformity with JIS Z8781-4:2013 and JIS Z8719-1996.

2. The molded piece set according to claim 1,
    wherein the two or more colored molded pieces contain different polymers and/or contain different additives.

3. The molded piece set according to claim 1,
    wherein the two or more colored molded pieces contain different polymers and/or contain different additives other than dyes and pigments, and
    the two or more colored molded pieces contain a same dye or pigment.

4. The molded piece set according to claim 2,
    wherein the polymers include at least two selected from the group consisting of a fluoroelastomer, silicone rubber, ethylene-propylene-diene rubber, styrene-butadiene rubber, nitrile rubber, acrylic rubber, a polyester elastomer, a polyurethane elastomer, polypropylene, polyethylene, polyvinyl chloride, and nylon.

5. The molded piece set according to claim 1,
    wherein the molded piece set is used for an automobile interior, a wearable device, a pair of eyeglasses, a health product, a mobile electronic device, an earphone, a sport item, a kitchen item, a pet item, a home appliance, or an audio item.

6. The molded piece set according to claim 1,
    wherein the molded piece set is used for an automobile interior or a wearable device.

7. A computer color matching system for toning colors of two or more colored molded pieces having different compositions in a molded piece set to substantially a same color, the computer color matching system comprising:
    a controller; and
    a storage, the controller being programmed to execute:
a process (1) of receiving input of a color specification value data set corresponding to a desired target color; and
a process (2) of calculating ratios of colorants for adjusting a CIEDE2000 color difference to 1.0 or lower and a metamerism index to 1.0 or lower between one of the colored molded pieces and at least another of the colored molded pieces based on the input color specification value data set and color data sets that are stored in the storage and that correspond to the two or more respective colored molded pieces having different compositions, the CIEDE2000 color difference and the metamerism index being determined by the following methods:

(CIEDE2000 color difference)
the CIEDE2000 color difference being determined by colorimetry on each colored molded piece in conformity with JIS Z8722:2009 with an F2 light source and a 10° visual field in conformity with JIS Z8781-4:2013 and JIS Z8781-6:2017;

(metamerism index)
the metamerism index being determined by colorimetry on each colored molded piece in conformity with JIS Z8722:2009 with F2 and $D_{65}$ light sources and a 10° visual field at a wavelength interval of 10 nm in conformity with JIS Z8781-4:2013 and JIS Z8719-1996.

8. A database comprising color data sets corresponding to two or more respective colored molded pieces having different compositions,
the color data sets being read out by a controller and used for calculating ratios of colorants for adjusting a CIEDE2000 color difference to 1.0 or lower and a metamerism index to 1.0 or lower between one of the colored molded pieces and at least another of the colored molded pieces, the CIEDE2000 color difference and the metamerism index being determined by the following methods:

(CIEDE2000 color difference)
the CIEDE2000 color difference being determined by colorimetry on each colored molded piece in conformity with JIS Z8722:2009 with an F2 light source and a 10° visual field in conformity with JIS Z8781-4:2013 and JIS Z8781-6:2017;

(metamerism index)
the metamerism index being determined by colorimetry on each colored molded piece in conformity with JIS Z8722:2009 with F2 and $D_{65}$ light sources and a 10° visual field at a wavelength interval of 10 nm in conformity with JIS Z8781-4:2013 and JIS Z8719-1996.

9. A method for producing a molded piece set that includes two or more colored molded pieces having different compositions, each colored molded pieces being a molded piece of a polymer and having a value V of 8.8 or lower or a chroma C of 1.0 or higher in the Munsell color system, the method comprising
a step (1) of adjusting a CIEDE2000 color difference to 1.0 or lower and a metamerism index to 1.0 or lower between one of the colored molded pieces and at least another of the colored molded pieces, the CIEDE2000 color difference and the metamerism index being determined by the following methods:

(CIEDE2000 color difference)
the CIEDE2000 color difference being determined by colorimetry on each colored molded piece in conformity with JIS Z8722:2009 with an F2 light source and a 10° visual field in conformity with JIS Z8781-4:2013 and JIS Z8781-6:2017;

(metamerism index)
the metamerism index being determined by colorimetry on each colored molded piece in conformity with JIS Z8722:2009 with F2 and $D_{65}$ light sources and a 10° visual field at a wavelength interval of 10 nm in conformity with JIS Z8781-4:2013 and JIS Z8719-1996.

\* \* \* \* \*